May 6, 1930.  B. S. MINOR  1,757,539
LUBRICATING DEVICE FOR CABLES
Filed April 14, 1928
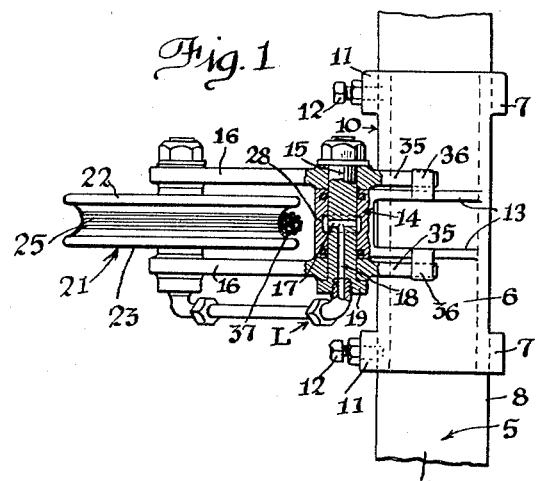
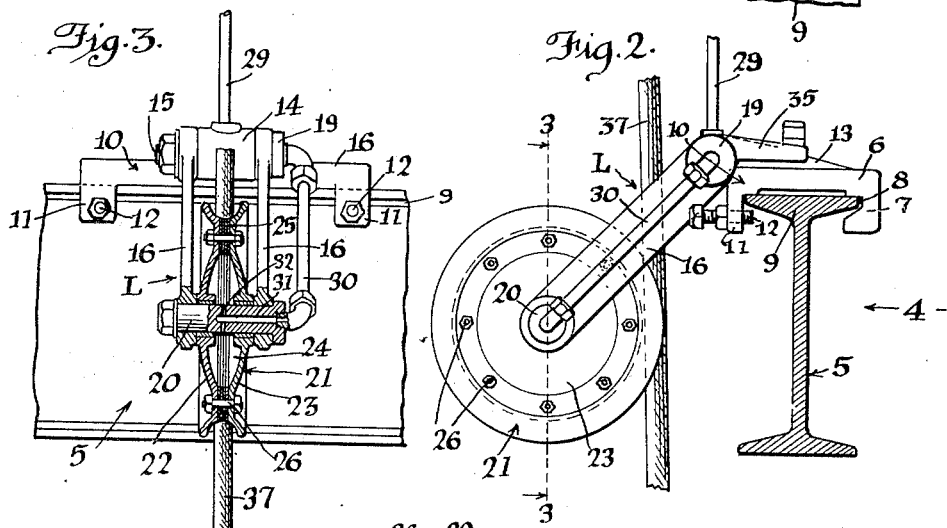
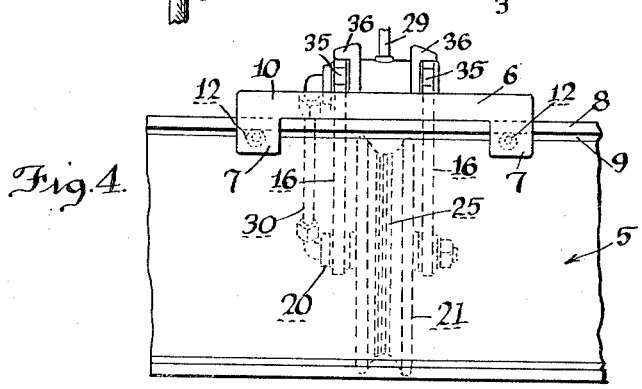
Inventor.
Burt S. Minor.
Attorney Patented May 6, 1930

1,757,539

UNITED STATES PATENT OFFICE

BURT S. MINOR, OF SAN PEDRO, CALIFORNIA, ASSIGNOR TO REGAN FORGE AND ENGINEERING COMPANY, OF SAN PEDRO, CALIFORNIA, A CORPORATION OF CALIFORNIA

LUBRICATING DEVICE FOR CABLES

Application filed April 14, 1928. Serial No. 269,976.

This invention relates to a mechanism for applying a lubricant to hoisting cables during their operation.

A main object of the invention is to provide a device that will continuously apply a lubricant to a moving cable line and automatically adjust itself to the movements of the cable during its operation.

Another object is to provide a device in which the chamber of the rotatable lubricating element is continuously supplied with a lubricant. A further object is to provide a cable lubricating device in which the cable lubricating element is provided with a lubricant chamber, and to provide means for adjusting the flow of lubricant from the chamber in order that an excessive flow will not be delivered.

This invention has been designed more particularly for use in connection with oil well drilling rigs for applying a lubricant to the "fast moving cable lines," and briefly it consists of an automatically movable base member designed to be mounted on the upper flange of one of the crown block I beams. Swingingly secured to this base member are a pair of sheave supporting arms, their free ends carrying a bearing pin. Rotatably mounted on this pin is a lubricating wheel formed with a lubricant chamber, the chamber being supplied with a lubricant (such as a heavy engine oil) through the bearing pins of the swinging sheave arms from a source of supply (not shown). The lubricating wheel is of sheave form consisting of two circular concaved members bolted together to form a lubricant chamber, a number of felt rings being interposed between the two members adjacent the grooved periphery of the wheel for feeding the lubricant to the cable as it contacts therewith. By adjusting the bolts that secure the wheel members together the amount of flow of the lubricant through the felt rings may be readily controlled.

In the drawings wherein a single embodiment is illustrated:

Fig. 1, is a plan view partly in section of the lubricating device mounted on a crown block beam.

Fig. 2, is a side elevation of the same.

Fig. 3, is a sectional front elevation of the device taken on line 3—3 of Fig. 2.

Fig. 4, is a rear elevation of the device mounted on a crown block beam.

In the drawings 5 designates a transversely disposed I beam of an oil well crown block frame on which is mounted the cable lubricating device L, that preferably consists of a base member 6 provided on one of its side edges and at each of its ends with a downwardly extending hook 7 adapted to engage one of the webs 8 of the upper flange 9 of the I beam. The opposite side edge 10 of the base 6 has similar lugs 11, but instead of the hooked ends transversely disposed set screws 12 are provided in order that the base may be detachably secured to the flange of the beam. By means of the foregoing description it will be apparent that the base member may be readily moved during its operation longitudinally along the I beam, as will be more fully explained hereinafter.

Formed integral with the upper face of the base member midway of its ends and projecting beyond the side edge 10 is a pair of bearing lugs 13, their outer ends terminating in a transversely disposed bearing 14 in which is mounted a headed stationary bearing pin 15 to whose ends are movably secured a pair of swinging arms 16. Pin 15 is provided with a transverse bore 17 for supplying a lubricant to the bearing 14 and a central longitudinal bore 18 that extends from the bore 17 outwardly through the head 19 of the pin 15. Mounted in the free lower ends of the arms 16 is another stationary headed bearing pin 20, exactly similar in construction as pin 15, the arms engaging the ends of the pin. Rotatably mounted on the pin 20 is a lubricating wheel 21 formed of two concaved members 22, 23, the concavites being oppositely disposed to form a lubricant chamber 24 when the members are secured together. The peripheries of the wheel members are flared outwardly in order that an annular cable groove will be formed when the wheel is assembled. Disposed between the two wheel members and extending from the outer circular edges of the concavites are a plurality of felt rings 25 their outer circular edges forming the bottom of the annular wheel groove. The wheel members are secured together by means of a plurality of bolts 26 that pass through the felt lubricating rings. As the material of which the rings are formed is fibrous it will be apparent that the lubricant from the chamber 24 will be conveyed to the outer edges of the rings that form the bottom of the annular groove. By tightening or loosening the bolts the flow of lubricant through the rings may be readily controlled.

The upper bearing 14 is provided with an annular recess 28 that communicates with the transverse bore 17 of the pin 15. Connected to the bearing 14 and extending upwardly therefrom and communicating with the annular recess 28 of the pin 15 is a lubricant supply pipe 29 that leads from a lubricant supply reservoir (not shown) located in a convenient position on the derrick or crown block structure. In operation the lubricant first passes through the flexible supply pipe 29 to the annular recess 28 in the bearing 14, through bores 17 and 18 in the headed pin 15, thence through a pipe line 30 to the bore 31 of pin 20 and thence into the lubricating chamber 24 of the sheave wheel 21 through a transverse bore 32 in the pin 20.

The upper ends of the arms 16 are provided with extensions 35 that extend rearwardly and between the upper face of the base member and a pair of stop lugs 36 that are formed integral with the upper surface of the lugs 13. These stop lugs serve to limit the downward swing of the sheave wheel supporting arms 16. By swingingly mounting the lubricating wheel a perfect yielding contact with the cable line is always maintained during its movement.

In operation the fast moving wire cable line 37 passes upwardly between the lubricating wheel supporting arms 16 engaging the groove of the wheel. On a movement of the line in either direction the wheel will rotate and deliver the requisite amount of lubricant to the surface of the cable that contacts with its sheave on the crown block.

Any side movement of the cable line during its operation is provided automatically by the movement of the base member along the flange of the I beam, the base member sliding freely thereon, thus preventing an accidental disengagement of the line with the lubricating wheel.

I claim:

1. A lubricating device for hoisting cables comprising a base member mounted for movement along a support, a bearing formed on the base member, a stationary bearing pin mounted in said bearing having a lubricating bore formed therein, said bore being in communication through the base member bearing to a source of lubricant supply, a pair of sheave supporting arms swingingly mounted on the ends of said bearing pin, a cable lubricating wheel having a lubricant chamber mounted on the free ends of the supporting arms, means to deliver the lubricant from the wheel chamber to its periphery, and means for feeding a lubricant from the bored bearing pin to the lubricant chamber of the lubricating wheel.

2. A lubricating device for cable lines comprising a base member, a pair of arms swingingly secured to the base member, and carrying a conduit means, a lubricating sheave rotatably mounted in the free end of said arms, said sheave being provided with a lubricant chamber, means to deliver a lubricant from the said chamber to the periphery of the sheave, and means to continually supply the sheave lubricant chamber with a lubricant.

3. A lubricating device for cable lines comprising a base member, a lubricating sheave having a lubricant chamber swingingly connected to said member, means to deliver lubricant from the chamber to the periphery of the sheave, and means to feed a lubricant to the sheave lubricant chamber.

4. A cable lubricating device comprising a base member mounted for movement, a lubricating sheave having a lubricant chamber pivotally connected to said base member, means to deliver the lubricant from the lubricant chamber of the sheave to its periphery, and means to continuously supply the chamber with a lubricant.

5. A cable lubricating device comprising a base member mounted for sliding movement, means to detachably secure the base member to a supporting structure, a bearing formed integral with said base member, a fixed bearing pin mounted in said bearing having a bore therein, a pair of sheave supporting arms hingedly secured to the ends of said pin, a second fixed bearing pin mounted in the free ends of said arms, having a bore extending inwardly from one end, an oil line pipe connecting the bores of the two bearing pins, a cable sheave having a lubricant chamber mounted for rotation on said second bearing pin, the inner end of the bore of said pin communicating with said chamber, means to feed the lubricant from the chamber to the groove of the cable sheave, and means to feed a lubricant to the sheave chamber.

6. A cable lubricating device comprising a base member adapted to be slidingly secured to a support and to be automatically actuated by the movement of the cable line, and a lubricating cable sheave pivotally secured to said base member, said sheave being provided with a lubricant receiving chamber, said sheave adapted to distribute the lubricant from the sheave chamber to a cable line on a movement of said line.

7. A cable lubricating device comprising a base member, a cable sheave provided with a lubricant chamber movably connected to said base member, said sheave consisting of a pair of complemental members detachably secured together, and an absorbent means interposed between the contacting surfaces of the sheave members, whereby the lubricant from the chamber will be distributed to the sheave groove.

8. A cable lubricating device comprising a cable sheave formed of a pair of complemental members each having a centrally disposed concavity adapted to form a lubricant receiving chamber when the two members are secured together, and absorbent means extending from the outer edge of the lubricant chamber to the sheave groove.

In testimony whereof I affix my signature.

BURT S. MINOR.